United States Patent
An et al.

(10) Patent No.: US 7,532,296 B2
(45) Date of Patent: May 12, 2009

(54) THIN-FILM TRANSISTOR SUBSTRATE AND LIQUID CRYSTAL DISPLAY DEVICE HAVING THE SAME

(75) Inventors: Bo-Young An, Suwon-si (KR); Hyung-Guel Kim, Yongin-si (KR); Dong-Hwan Kim, Suwon-si (KR); Do-Kyun Kim, Yongin-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 230 days.

(21) Appl. No.: 11/510,145

(22) Filed: Aug. 22, 2006

(65) Prior Publication Data
US 2007/0046884 A1  Mar. 1, 2007

(30) Foreign Application Priority Data
Aug. 24, 2005  (KR) ............... 10-2005-0077607
Oct. 5, 2005  (KR) ............... 10-2005-0093204

(51) Int. Cl.
*G02F 1/1345* (2006.01)

(52) U.S. Cl. .............. 349/151; 349/152; 349/139; 349/42

(58) Field of Classification Search ........... 349/151, 349/42, 43, 45, 46, 56, 139, 140, 149, 150, 349/152, 158, 106
See application file for complete search history.

(56) References Cited

U.S. PATENT DOCUMENTS

| | | | |
|---|---|---|---|
| 6,864,940 B2 * | 3/2005 | Shimada et al. | 349/143 |
| 2001/0008435 A1 * | 7/2001 | Shimada et al. | 349/106 |
| 2004/0061176 A1 * | 4/2004 | Takafuji et al. | 257/347 |
| 2007/0046884 A1 * | 3/2007 | An et al. | 349/151 |

* cited by examiner

*Primary Examiner*—Brian M Healy
(74) *Attorney, Agent, or Firm*—Haynes and Boone, LLP (57) ABSTRACT

A reduced power thin-film transistor (TFT) array substrate includes a display section, a peripheral section, a driving circuit section and a driver chip. The display section includes a high definition section and a low definition section. The peripheral section surrounds the display section. The driving circuit section is formed on the peripheral section and is configured to provide the high definition section with a plurality of first gate signals. The driver chip is mounted on the peripheral section to provide the low definition section with a plurality of second gate signals.

51 Claims, 8 Drawing Sheets

THIN-FILM TRANSISTOR SUBSTRATE AND LIQUID CRYSTAL DISPLAY DEVICE HAVING THE SAME

CROSS-REFERENCE TO RELATED APPLICATIONS

This application relies for priority upon Patent Application No. 2005-77607 filed in the Korean Intellectual Property Office, Republic of Korea, on Aug. 24, 2005, and Patent Application No. 2005-93204 filed in the Korean Intellectual Property Office, Republic of Korea, on Oct. 5, 2005, the contents of which are hereby incorporated by reference in their entireties.

BACKGROUND OF THE INVENTION

1. Field of the Invention

The present invention relates to a thin-film transistor (TFT) array substrate and a liquid crystal display device having the TFT array substrate. More particularly, the present invention relates to a TFT array substrate capable of reducing power consumption, and a liquid crystal display device having the TFT array substrate 2. Description of the Related Art In general, a liquid crystal display (LCD) device includes two substrates having electrodes, respectively, and a liquid crystal layer disposed between the two substrates. The liquid crystal layer has dielectric anisotropy. When a voltage is applied to the electrodes, an electric field is generated between the electrodes. By controlling the electric fields, an optical transmittance of the liquid crystal layer is adjusted to display an image.

The LCD device displays an image by using ambient light or artificial light. When the LCD device uses artificial light, the LCD device employs a backlight assembly for generating the artificial light. The backlight assembly typically employs a cold cathode fluorescent lamp (CCFL), an external electrode fluorescent lamp (EEFL), or a light-emitting diode (LED), etc. as a light source. Power consumption by the backlight assembly comprises most of power consumption of the LCD device. Therefore, when the efficiency of the backlight assembly is increased or the usage time is reduced, power consumption is reduced. In particular, a mobile device such as a cellular phone may use a battery as a power source, so that the available electric power may be limited. Therefore, there remains a need in the art for a mobile device capable of operation with reduced power consumption.

SUMMARY OF THE INVENTION

In accordance with one or more embodiments of the present invention, a thin-film transistor (TFT) array substrate capable of reducing power consumption and a liquid crystal display device having the TFT array substrate are provided.

In a TFT array substrate according to an exemplary embodiment of the present invention, the TFT array substrate includes a display section, a peripheral section, a driving circuit section and a driver chip. The display section includes a high definition section and a low definition section. The peripheral section surrounds the display section. The driving circuit section is formed on the peripheral section to provide the high definition section with first gate signals. The driver chip is mounted on the peripheral section to provide the low definition section with second gate signals.

In a TFT array substrate according to another exemplary embodiment of the present invention, the TFT array substrate operates in a full operation mode or in a standby mode. The array substrate includes a base substrate, a main display section, a sub display section, a driving circuit section and a driver chip. The main display section is formed on the base substrate. The main display section operates in the full operation mode. The sub display section formed on the base substrate. The sub display section operates in the standby mode. The driving circuit section is directly formed on the base substrate. The driving circuit section provides the main display section with first gate signals. The driver chip is mounted on the base substrate. The driver chip provides the sub display section with second gate signals.

In a TFT array substrate according to still another example embodiment of the present invention, the TFT array substrate includes a display section, a peripheral section and a driving circuit section. The display section has a plurality of regions. The peripheral section surrounds the display section. The driving circuit section is formed on the peripheral section. The driving circuit section includes an amorphous silicon thin-film transistor that provides at least one of the regions of the display section with gate signals.

In a TFT array substrate according to still another exemplary embodiment of the present invention, the TFT array substrate includes a display section, a peripheral section and a driving circuit section. The display section has a plurality of regions. The peripheral section surrounds the display section. The driving circuit section is integrally formed with the TFT substrate. The driving circuit provides one of the regions of the display section with a first gate signal.

In a TFT array substrate according to still another exemplary embodiment of the present invention, the TFT array substrate includes a substrate, a driver chip, a signal wiring and a driving circuit section. The substrate includes a display section having a first display section for displaying a first image, and a second display section for displaying a second image. The driver chip provides the first display section with a first gate signal. The signal wiring is formed along at least a first side of the first and second display sections. The signal wiring conducts or transfers the first gate signal from the driver chip to the first display section. The driving circuit section is formed along at least a second side of the display section, the driving circuit section providing the second display section with a second gate signal.

In a TFT array substrate according to still another exemplary embodiment of the present invention, the TFT array substrate includes a display section, a peripheral section, a first driving circuit section and a second driving circuit section. The display section includes a first display section and a second display section. The peripheral section surrounds the display section. The first driving circuit section is formed on a portion of the peripheral section, which is adjacent to the first display section. The first driving circuit section provides a first gate signal to the first display section. The second driving circuit section is formed on a portion of the peripheral section, which is adjacent to the second display section. The second driving section provides a second gate signal to the second display section.

In a liquid crystal display (LCD) device according to an exemplary embodiment of the present invention, the LCD device includes a TFT array substrate, an opposing substrate, and a liquid crystal layer. The TFT array substrate includes a plurality of pixels that are arranged in a matrix configuration or shape and defined by gate lines and data lines. Each of the pixels includes a thin-film transistor that is electrically connected to one of the gate lines and one of the data lines. The opposing substrate is combined with the TFT substrate such that the opposing substrate faces the TFT array substrate. The liquid crystal layer is disposed between the TFT array substrate and the opposing substrate. The TFT array substrate further includes a display section, a peripheral section and a driving circuit section. The display section includes a plurality of regions. The peripheral section surrounds the display section. The driving circuit section is integrally formed with the TFT array substrate. The driving circuit section provides at least one of the regions of the display section with a first gate signal.

In a liquid crystal display (LCD) device according to an exemplary embodiment of the present invention, the LCD device includes an LCD panel and a driver chip. The LCD panel includes a TFT array substrate, an opposing substrate, and a liquid crystal layer. The TFT array substrate includes a display section and a peripheral section surrounding the display section. The peripheral section includes a plurality of driving circuit sections formed thereon. The driving circuit section provides the display section with a gate signal. The opposing substrate is combined with the TFT array substrate such that the opposing substrate faces the TFT array substrate. The liquid crystal layer is disposed between the TFT array substrate and the opposing substrate. The driver chip provides the driving circuit sections with a gate driving signal.

According to embodiments of the TFT array substrate and the LCD device described above, even when the display device does not display the main image, the display device displays a standby image that may be helpful to a user through a portion of the display section. Therefore, power consumption may be reduced in comparison with a situation where an entire portion of the display section is activated. Additionally, the sub display section that displays the standby image is driven through the driver chip that is mounted on the TFT array substrate and has low power consumption, and the main display section that is occasionally activated is driven by TFTs directly formed on the TFT array substrate. As a result, the driver chip size is reduced while also reducing power consumption.

BRIEF DESCRIPTION OF THE DRAWINGS

The above and other features and advantages of the present invention will become more apparent by describing in detailed example embodiments thereof with reference to the accompanying drawings, in which.

DESCRIPTION OF THE EMBODIMENTS

The invention is described more fully hereinafter with reference to the accompanying drawings, in which embodiments of the invention are shown. This invention may, however, be practiced in many different forms and should not be construed as limited to the embodiments set forth herein. Rather, these embodiments are provided so that this disclosure will be thorough and complete, and will fully convey the scope of the invention to those skilled in the art. In the drawings, the size and/or relative sizes of layers and regions may be exaggerated for clarity.

It will be understood that when an element or layer is referred to as being "on," "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numbers refer to like elements throughout. As used herein, the term "and/or" includes any and all combinations of one or more of the associated items.

It will be understood that, although terms like first, second, third may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" can encompass both an orientation of above and below. The device may be otherwise oriented (rotated 90 degrees or at other orientations) and the spatially relative descriptors used herein interpreted accordingly.

The terminology used herein is for describing particular embodiments only and is not intended to be limiting of the invention. As used herein, the singular forms "a,", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the invention are described herein with reference to cross-sectional illustrations that are schematic illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than an abrupt change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 1:
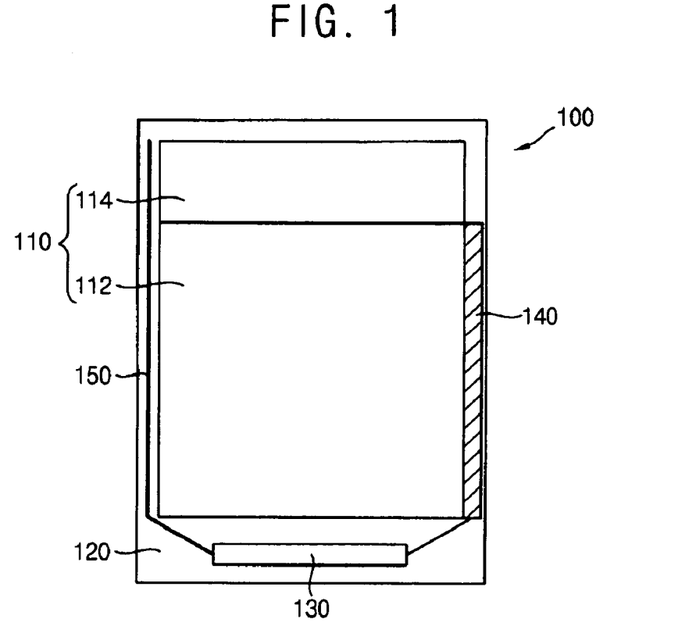
FIG. 1 is a plan view illustrating a TFT array substrate according to a first exemplary embodiment of the present invention.

Hereinafter, the present invention will be explained in detail with reference to the accompanying drawings. FIG. 1 is a plan view illustrating a TFT array substrate according to a first exemplary embodiment of the present invention. Referring to FIG. 1, a TFT array substrate 100 includes a display section 110, a peripheral section 120 surrounding the display section 110, and a gate driving circuit section 140 that is disposed adjacent to the display section 110. The display section 110 includes a main display section 112 and a sub display section 114. The TFT array substrate 100 may include more than two regions. A driver chip 130 is mounted on the peripheral section 120 of the TFT array substrate 100, and the gate driving circuit section 140 may be directly formed on the TFT array substrate 100. When the gate driving circuit section 140 is directly formed on the TFT array substrate 100, a chip size may be reduced to lower manufacturing cost of the chip in comparison with a case that the gate driving circuit section is mounted on the TFT array substrate 100.

For example, when a mobile phone is in a full operation mode, or when the mobile phone is used, the main display section 112 of a display device of the mobile phone operates a main image. On the other hand, when the mobile phone is in a standby mode, or when the main display section 112 is in an off-state in order to reduce power consumption, the sub display section 114 may display a sub image including a date, time, electric wave sensitivity, or residual charge of battery, etc., corresponding to an indicator. The sub display section may also display the sub image, even when the mobile phone is in the full operation mode.

The driver chip 130 provides the display section 110 with data signals for displaying an image, provides the gate driving section, which provides the main display section 112 with the gate signals, with a gate driving signal such as a clock signal. Additionally, the driver chip 130 also provides the display section 114 with gate signals through a signal wiring 150. The gate driving circuit section 140 may be formed through thin-film transistors (TFTs) (not shown) formed on the TFT array substrate 100. The TFTs may include amorphous silicon or poly silicon. When the gate driving circuit section 140 is directly formed on the TFT array substrate 100, a chip size may be reduced to lower manufacturing cost of the chip in comparison with a case that the gate driving circuit section is mounted on the TFT array substrate 100. A gate driving circuit of the main display section 112 and a gate driving circuit of the sub display sections 114 may both be directly formed on the TFT array substrate 100. However, a gate driving circuit that is directly formed on the TFT array substrate 100 typically consumes more electrical power than a gate driving circuit formed as a chip that is to be mounted on the TFT array substrate. Therefore, the gate driving circuit section 140 that drives the main display section 112, which is typically operated for a relatively small time period, may be directly formed on the TFT array substrate 100, while the gate driving circuit section (not shown) that drives the sub display section 114, which is typically operated for a relatively long time period, may be formed as the driver chip 130, where the driver chip 130 may be mounted on the TFT array substrate 100. Then, both the size of the driver chip 130 and the power consumption may be reduced.

When a display panel having the TFT array substrate 100 described above operates only the sub display section 114, signals may be applied only to the gate driving circuit section that drives the sub display section 114, but not to the gate driving circuit section 140 that drives the main display section 112. Additionally, data signals may be applied only to data lines (not shown) that are extended to the sub display section 114, and not to data lines (not shown) that are extended only to the main display section 112. Alternatively, the data signals may be applied to both of the data lines (not shown) that are extended to the sub display section 114, and the data lines (not shown) that are extended only to the main display section 112.

Figure 2:
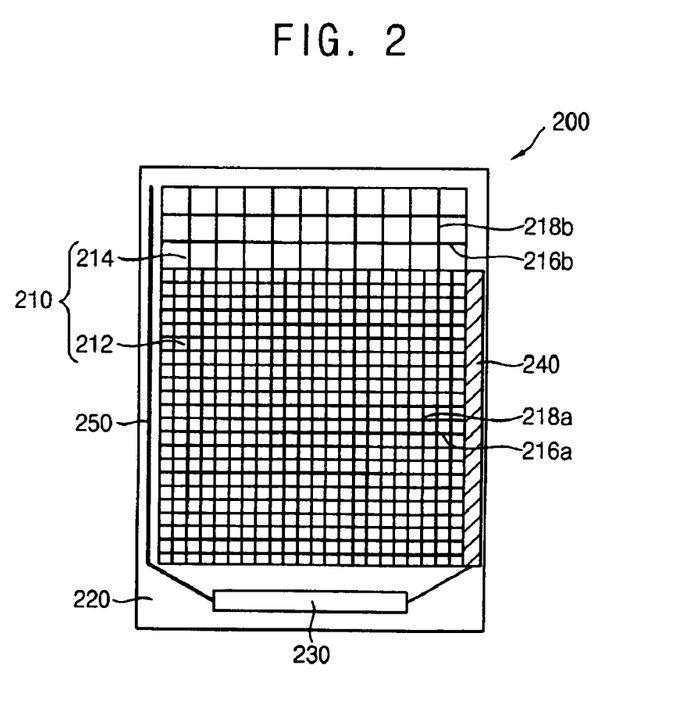
FIG. 2 is a plan view illustrating a TFT array substrate according to a second exemplary embodiment of the present invention.

FIG. 2 is a plan view illustrating a TFT array substrate according to a second exemplary embodiment of the present invention. Referring to FIG. 2, a TFT array substrate 200 includes a display section 210 and a peripheral section 220 surrounding the display section 210, and a gate driving circuit section 240. The display section 210 includes a high definition section 212 and a low definition section 214 pertaining to the image resolution within each section. The display section 210 may include more than two regions, where each of the regions may have a different resolution. A driver chip 230 may be mounted on the peripheral section 220, and the gate driving circuit section 240 may be directly formed on the TFT array substrate 200.

The low definition section 214 has a pixel area which may be, for example, four times larger in area than that of high definition section 212. However, the pixel area ratio of the high definition section 212 and the low definition section 214 may vary. The low definition section 214 may display a sub image including a date, time, electric wave sensitivity, or residual charge of battery, corresponding to an indicator as described in reference to the sub display section 114 in FIG. 1. The high definition section 212 may be used to produce a high definition image. The high definition section 212 may correspond to the main display section 112 in FIG. 1.

Similar to the description in reference to FIG. 1, the driver chip 230 provides the display section 210 with data signals for displaying an image, provides the gate driving section 240, which provides the high definition section 212 with the gate signals, with a gate driving signal such as a clock signal. Additionally, the driver chip 230 also provides the low definition section 214 with gate signals through a signal wiring 250. The gate driving circuit section (not shown) that drives the low definition section 214, which may be operated for a relatively long time period, is formed as a driver chip 230 that may be mounted on the TFT array substrate 200, and the gate driving circuit section that drives the high definition section 212, which is operated for a relatively small time period, and may be directly formed on the TFT array substrate 200.

The TFT array substrate 200 includes a plurality of high definition section gate lines 216a, a plurality of low definition section gate lines 216b formed thereon, even-numbered data lines 218b and odd-numbered gate lines 218a. The even-numbered data lines 218b are electrically insulated from the high definition section gate lines 216a and the low definition section gate lines 216b, and the odd-numbered data lines 218a cross only the high definition section gate lines 216a. A distance between the low definition section gate lines 216b may be, for example, twice the distance between the high definition section gate lines 216a.

When a display panel having the TFT array substrate 100 described above operates only the low definition section 214, signals may be applied only to the gate driving circuit section that drives the low definition section 214, but not to the gate driving circuit section 240 that drives the high definition section 212. Additionally, data signals may be applied only to the even-numbered data lines 218b that are extended to the low definition section 214, and not to the odd-numbered data lines 218a that are extended only to the high definition section 212. Alternatively, the data signals may be applied to both of the even-numbered data lines 218b that are extended to the low definition section 214, and the odd-numbered data lines 218a that are extended only to the high definition section 212.

Figure 3:
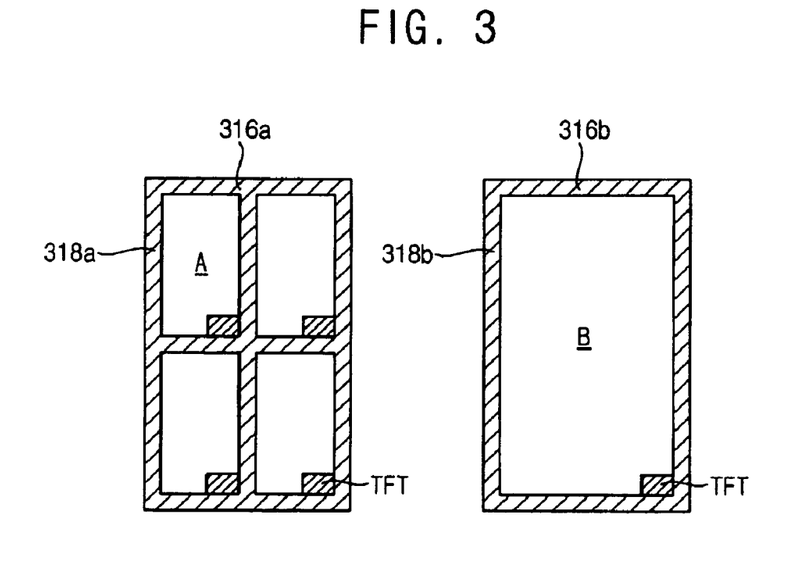
FIG. 3 is a plan view illustrating a high definition pixel and a low definition pixel according to the second exemplary embodiment of the present invention.

FIG. 3 is a plan view illustrating a high definition pixel and a low definition pixel according to the second exemplary embodiment of the present invention. Referring to FIG. 3, a pixel 'B' of the low definition section 214 has a larger area than a pixel 'A' of the high definition section 212, and gate lines 316a and 316b, data lines 318a and 318b, and the thin-film transistors TFTs in the low definition section 214 have substantially same size as that of the high definition section 212. As a result, an aperture ratio of the low definition section 214 is higher than that of the high definition section 212. The aperture ratio corresponds to a ratio of area transmitting or reflecting light compared with the entire area of the display section. When the aperture ratio is increased, a light utilization efficiency is enhanced with ambient light, even when the light source of the backlight assembly is turned-off, enhancing the display quality. In FIGS. 2 and 3, the size of the pixel 'B' of the low definition section 214 may be, for example, four times larger than that of the pixel 'A' of the high definition section 212, but a size of the pixel 'B' may vary.

Figure 4:
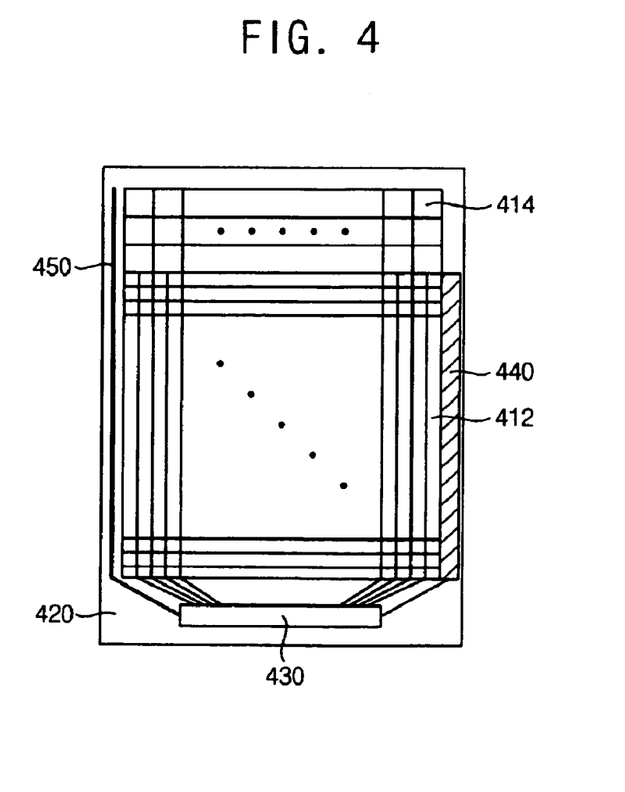
FIG. 4 is a plan view illustrating a TFT array substrate according to a third exemplary embodiment of the present invention.
Figure 5:
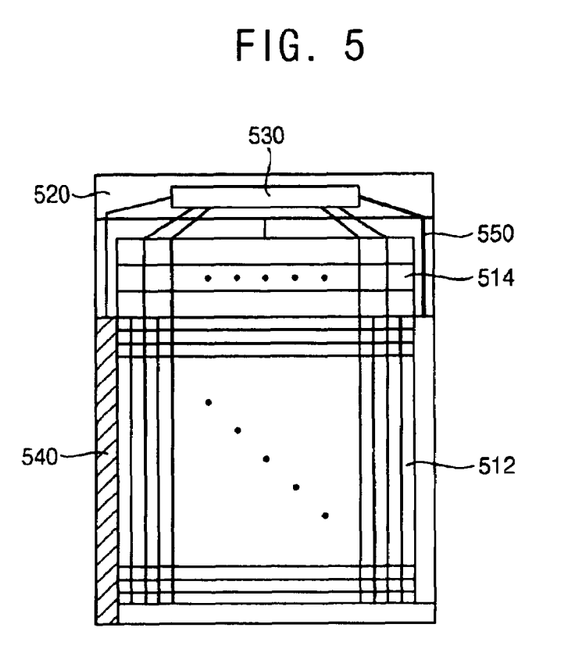
FIG. 5 is a plan view illustrating a TFT array substrate according to a fourth exemplary embodiment of the present invention.

FIG. 4 is a plan view illustrating a TFT array substrate according to a third exemplary embodiment of the present invention. FIG. 5 is a plan view illustrating a TFT array substrate according to a fourth exemplary embodiment of the present invention. Referring to FIG. 4, a driver chip 430 may be formed on a peripheral section 420 adjacent to a high definition section 412. A gate driving circuit section 440 may be formed at a first side of a high definition section 412, where the driver chip 430 is not formed, and a signal wiring 450 extending from the driver chip 430 to conduct or transfer the gate signal to a low definition section 414 may be formed at a second side of a low definition section 414.

Referring to FIG. 5, a driver chip 530 may be formed on a peripheral section 520 adjacent to a low definition section 514. A gate driving circuit section 540 may be formed at a first side of a high definition section 512, where the driver chip 530 is not formed (i.e. not located), and a signal wiring 550 extending from the driver chip 530 to conduct or transfer a gate signal to a low definition section 514 may be formed at a second side of a low definition section 514.

Figure 6:
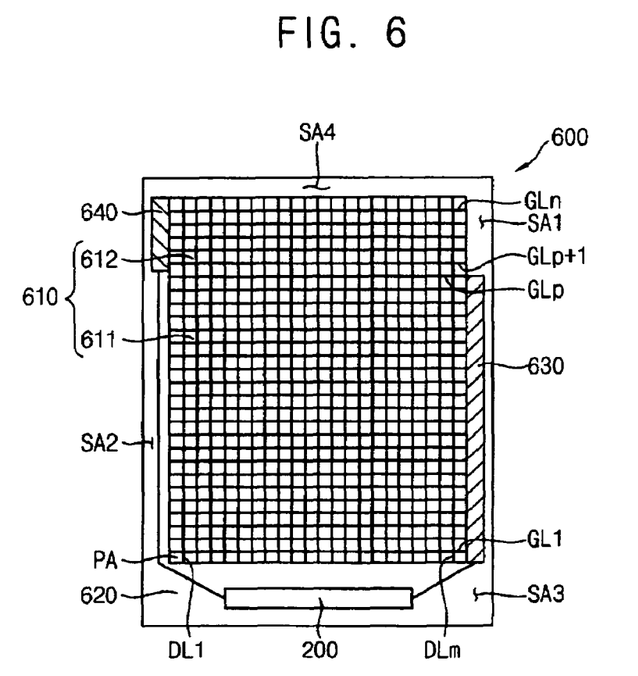
FIG. 6 is a plan view illustrating a TFT array substrate according to a fifth exemplary embodiment of the present invention.

FIG. 6 is a plan view illustrating a TFT array substrate according to a fifth exemplary embodiment of the present invention. Referring to FIG. 6, a TFT array substrate 600 according to an exemplary embodiment of the present invention includes a display section 610, a peripheral section 620, a first driving circuit section 630 and a second driving section 640. A driver chip 200 may be mounted on the first and second driving circuit sections 630 and 640. According to the present embodiment, the display section 610 includes a first display section 611 and a second display section 612. Alternatively, the display section 610 may include more than two display sections.

The first display section 611 corresponds to a main display section and may include a plurality of pixels PA defined by first to p-th gate lines GL1~GLp and first to m-th data lines DL1~DLm. The gate lines GL1~GLp extend along a first direction while the data lines DL1~DLm extend along a second direction that is substantially perpendicular to the first direction. As a result, the pixels PA are arranged in a matrix or array configuration. Each of the pixels PA includes a TFT that is electrically connected to one of the gate lines GL1~GLp and one of the data lines DL1~DLm. The first display section 611 corresponds to a main display section that displays a main image, when a display device of a mobile device such as a cellular phone operates in a driving mode.

The second display section 612 corresponds to a sub display section. The second display section 612 includes a plurality of pixels PA defined by (p+1)-th to n-th gate lines GLp+1~GLn and first to m-th data lines DL1~DLm. The gate lines GLp+1~GLn extend along the first direction while the data lines DL1~DLm extend along the second direction that is substantially perpendicular to the first direction. As a result, the pixels PA are arranged in a matrix or array configuration. Each of the pixels PA includes a TFT that is electrically connected to one of the gate lines GLp+1~GLn and one of the data lines DL1~DLm. The second display section 612 corresponds to a sub display section that may display a standby image including a date, time, electric wave sensitivity, or residual charge of battery.

In one embodiment, the second display section 612 may be operated only when a display device of a mobile device such as a cellular phone operates in a standby mode. Alternatively, the second display section 612 may be operated, even when a display device of a mobile device such as a cellular phone operates in the full operation mode. The first display section 611 may have higher resolution than that of the second display section 612. In other words, the first display section 611 corresponds to a high density section, and the second display section 612 corresponds to a low density section.

During the driving mode, the second display section 612 may display the standby image. Alternatively, during the driving mode, the second display section 612 may be integrated with the first display section 611 to display a main image. The peripheral section 620 may include a first peripheral region SA1, a second peripheral region SA2, a third peripheral region SA3 and a fourth peripheral region SA4. The first driving circuit section 630 may be formed at the first peripheral region SA1. The first driving circuit section SA1 sequentially provides the first to p-th gate lines GL1~GLp with a first gate signal in response to a gate driving signal such as a clock signal, which is outputted from the driver chip 200. The second driving circuit section 640 may be formed at the second peripheral region SA2 that is opposite to the first peripheral region SA1. The second driving circuit section 640 provides the (p+1)-th to n-th gate lines GLp+1~GLn with a second gate signal in response to a gate driving signal such as a clock signal, which is asserted by the driver chip 200. The first and second driving circuit sections 630 and 640 may be formed by forming TFTs (not shown) at the first and second peripheral regions SA1 and SA2. The TFTs formed at the first and second peripheral regions SA1 and SA2 may be formed by amorphous silicon or poly silicon. When the first and second driving circuit sections 630 and 640 are formed on the TFT array substrate 600, the size of the driver chip 200 may be reduced in comparison with the situation where the first and second driving circuit sections 630 and 640 are integrally formed with the driver chip 200. As a result, the manufacturing cost may be reduced.

As shown in FIG. 6, the first and second driving circuit sections 630 and 640 may be formed at the first and second peripheral regions SA1 and SA2, respectively. However, locations of the first and second driving circuit sections 630 and 640 are not considered limiting. For example, both of the first and second driving sections 630 and 640 may be formed at the first peripheral region SA1 of the TFT array substrate or the second peripheral region SA2 of the TFT array substrate. The driver chip 200 may be mounted on the third peripheral region SA3. The driver chip 200 provides the data lines DL1~DLm with data signals for displaying an image. Additionally, the driver chip 200 provides the first and second driving circuit sections 630 and 640 with gate driving signals for driving first and second driving circuit sections 630 and 640 in the full operation mode or the standby mode. In other words, the driver chip 200 asserts the gate driving signals to both of the first and second driving circuit sections 630 and 640 in the driving mode. The driver chip 200 may be mounted on the fourth peripheral region SA4 that is opposite to the third peripheral region SA3.

Figure 7:
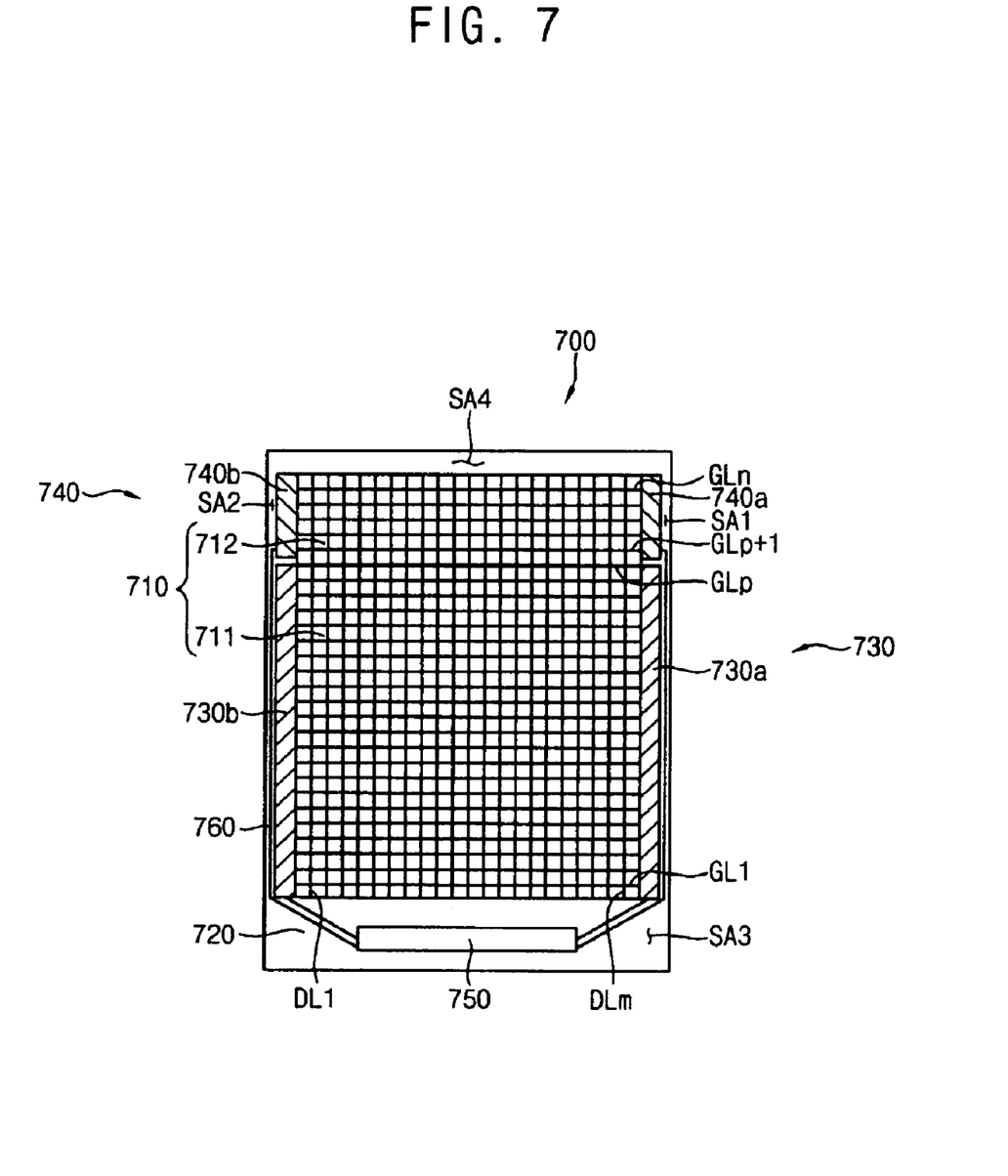
FIG. 7 is a plan view illustrating a TFT array substrate according to a sixth exemplary embodiment of the present invention.

FIG. 7 is a plan view illustrating a TFT array substrate according to a sixth exemplary embodiment of the present invention. Referring to FIG. 7, a TFT array substrate 700 according to the present embodiment includes a display section 710, a peripheral section 720, a first driving circuit section 730, a second driving circuit section 740 and a driver chip 750. The display section 710 includes a first display section 711 and a second display section 712. According to the present embodiment, the display section 710 includes the first and second display sections 711 and 712. Alternatively, the display section 710 may include more than two display sections. The first display section 711 corresponds to a high definition section, and the second display section 712 corresponds to a low definition section similar to the first and second display sections 611 and 612 discussed in reference to FIG. 6. Therefore, any further explanation will be omitted.

The peripheral section 720 includes a first peripheral region SA1, a second peripheral region SA2, a third peripheral region SA3 and a fourth peripheral region SA4. The first to fourth peripheral regions SA1, SA2, SA3 and SA4 surround the display section 710. The first driving circuit section 730 includes a first gate driving section 730a and a second gate driving section 730b. The first gate driving section 730a is formed at the first peripheral region SA1, and the second gate driving section 730b is formed at the second peripheral region SA2. Alternatively, the first and second gate driving sections 730a and 730b may be formed at the second and first peripheral regions SA2 and SA1, respectively.

The first gate driving section 730a provides odd-numbered gate lines GL1, GL3, ... among the gate lines GL1~GLp with a first gate signal in response to a gate driving signals such as a clock signal, which is asserted by the driver chip 750. The second gate driving section 730b provides even-numbered gate lines GL2, GL4, ... among the gate lines GL1~GLp with a first gate signal in response to a gate driving signals such as a clock signal, which is asserted by the driver chip 750. When only one driving circuit provides, the gate lines GL1~GLp with the first gate signals, an RC delay may be induced that increases power consumption. However, when two driving circuits alternately provide odd-numbered gate lines and even-numbered gate lines with the first gate signals, respectively, the RC delay may be reduced, thereby reducing power consumption. Furthermore, the time during which a gate line is activated increases, so that a liquid crystal capacitor electrically connected to a thin-film transistor TFT having a gate electrode that is electrically connected to the gate line has sufficient time to be electrically charged. As a result, the display quality of an LCD device including the novel TFT array substrate is enhanced.

The second driving circuit section 740 includes a third gate driving section 740a and a fourth gate driving section 740b. The third gate driving section 740a may be disposed in the first peripheral region SA1 of the peripheral section 720, and the fourth gate driving section 740b may be disposed in the second peripheral region SA2 of the peripheral section 720. Alternatively, the third and fourth gate driving sections 740a and 740b may be disposed in the second and first peripheral regions SA2 and SA1, respectively. The third gate driving section 740a and the fourth gate driving section 740b alternately provide odd-numbered gate lines and even-numbered gate lines of the gate lines GLp+1~GLn disposed in the second display section 712 with a second gate signal, respectively, in response to a gate driving signal such as a clock signal provided by the driver chip 750. Therefore, a power loss that may be induced by an RC-delay that occurs when only one driving circuit section provides the gate lines GL1~GLp with gate signals may be avoided. Furthermore, an activation time of each of the gate lines GL1~GLp increases, so that each of the TFT electrically connected to the gate lines GL1~GLp has sufficient time to be electrically charged. As a result, a display quality of LCD device may be enhanced.

The driver chip 750 may be mounted on the third peripheral region SA3 of the peripheral section 720. The driver chip 750 provides the data lines DL1~DLm formed at the display section 710 with data signals for displaying an image. The driver chip 750 also provides the first and second driving circuit sections 730 and 740 with gate driving signals. The TFT array substrate 700 may further include signal wiring 760 for conducting or transferring the gate driving signal such as a clock signal to the second driving sections 740. The signal wiring 760 may be formed at the first and second peripheral regions SA1 and SA2. The driver chip 750 may further include output pins electrically connected to the signal wiring 760. The driver chip 750 may be mounted on the fourth peripheral region SA4 that is opposite to the third peripheral region SA3.

Figure 8:
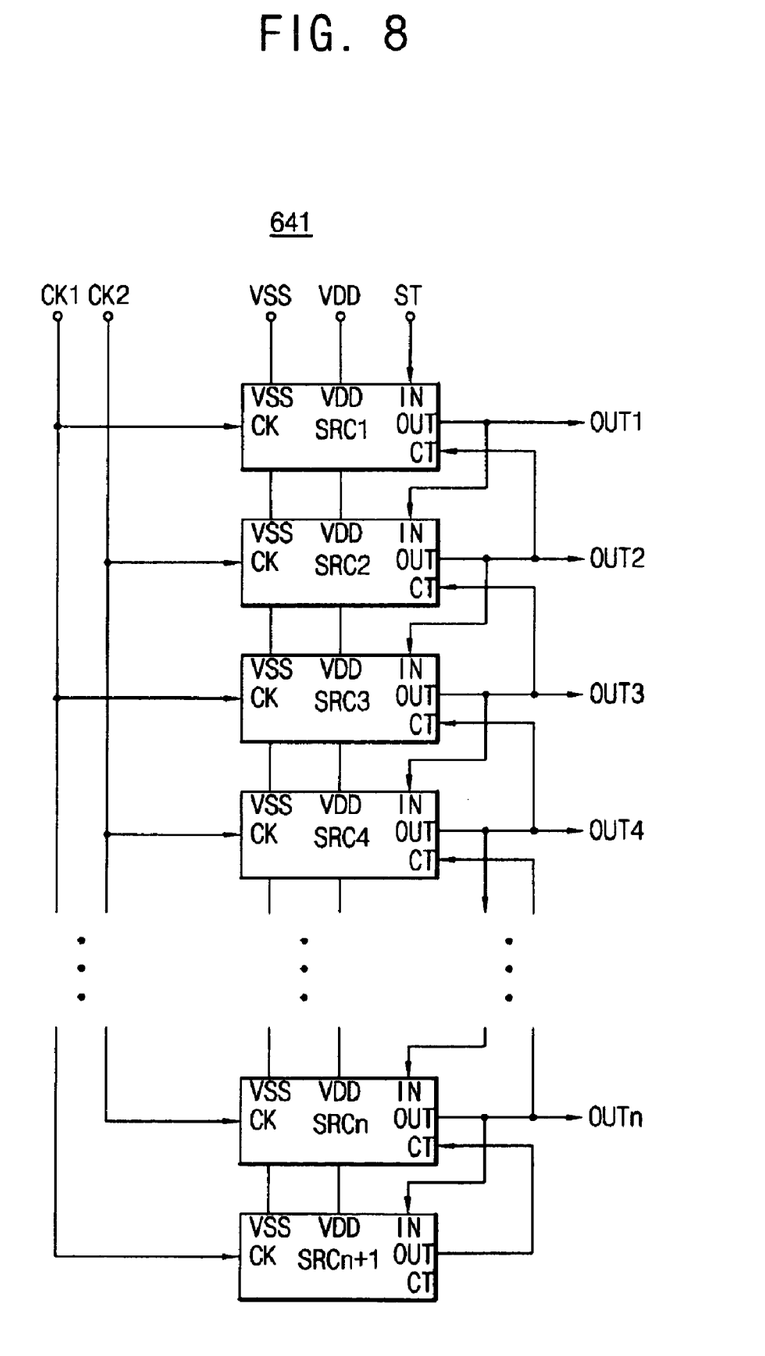
FIG. 8 is a block diagram illustrating an exemplary shift register implementation for a gate driving circuit.
Figure 9:
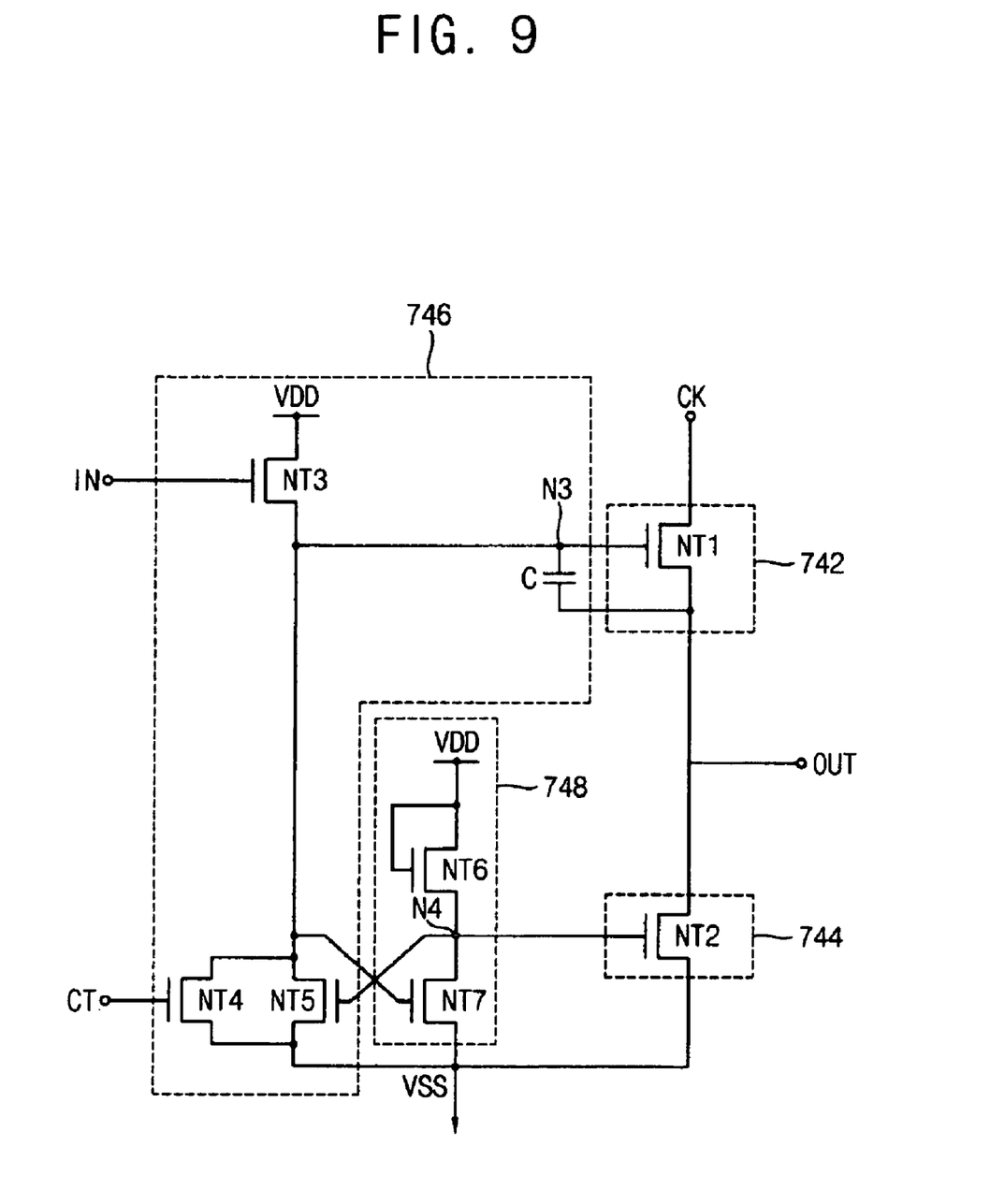
FIG. 9 is an equivalent circuit diagram illustrating an exemplary embodiment of each stage of the shift register in FIG. 8.
Figure 10:
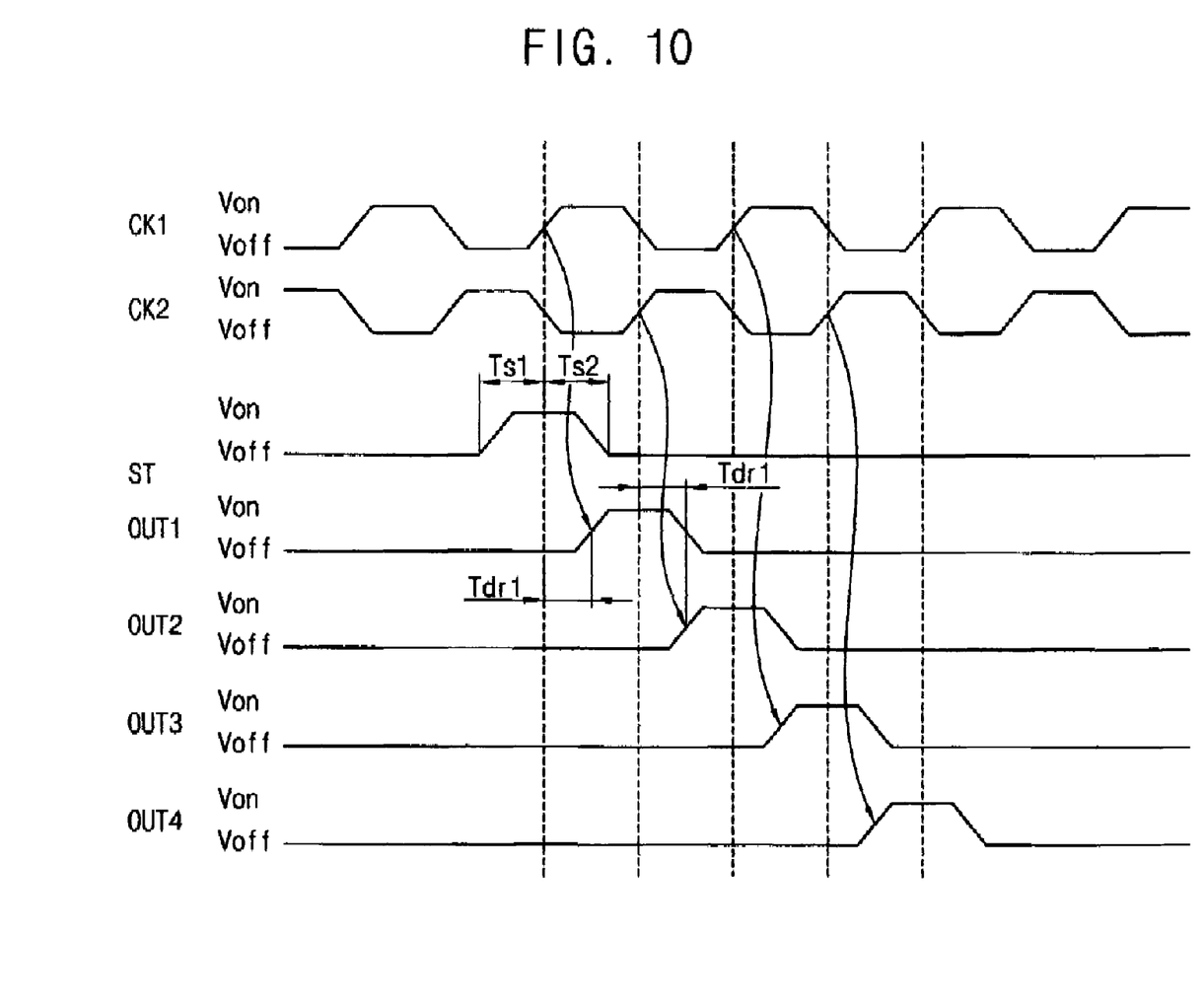
FIG. 10 is a timing diagram illustrating exemplary signal waveforms associated with the shift register in FIG. 8.

FIG. 8 is a block diagram illustrating an exemplary shift register implementation for a gate driving circuit. FIG. 9 is an equivalent circuit diagram illustrating an exemplary embodiment of each stage of the shift register in FIG. 8. FIG. 10 is a timing diagram illustrating exemplary signal waveforms associated with the shift register in FIG. 8. Referring to FIG. 8, the gate driving circuits 140 and 240 of FIGS. 1 and 2 may include a shift register 641 including a plurality of stages SRC1~SRCn+1, which are cascaded together. In other words, an output terminal OUT of a prior stage may be electrically connected to an input terminal IN of a subsequent stage. The shift register 641 may include n-number of stages SRC1~SRCn, and a dummy stage SRCn+1. The stages SRC1~SRCn are electrically connected to the gate lines GL1~GLp, respectively. Each of the stages SRC1~SRCn+1 may include the input terminal IN, the output terminal OUT, a clock signal input terminal CK, a first source voltage terminal VSS and a second source voltage terminal VDD. The input terminal IN of the first stage SRC1 may receive a scan start signal ST. The output terminals OUT1~OUTn of the first to n-th stages SRC1~SRCn are electrically connected to the first to n-th gate lines GL1~GLp, respectively. A first clock signal CK1 is applied to the odd-numbered stages SRC1, SRC3, . . . , and a second clock signal CK2 is applied to the even-numbered stages SRC2, SRC4, . . . . The first and second clock signals CK1 and CK2 have, for example, an opposite phase to each other.

Control terminals CT of the stages SRC1, SRC2, . . . , SRCn are electrically connected to output terminals OUT of the stages SRC2, SRC3, . . . SRCn+1, respectively, so that output signals OUT2, OUT3, . . . OUTn+1 of the stages SRC2, SRC3, . . . SRCn+1 are applied to the control terminals CT of the stages SRC1, SRC2, . . . , SRCn as a control signal. In other words, the control signal applied to the control terminals CT is delayed by a duty period of the output signal. As a result, output signals of the stages have sequentially active period (or high state), so that gate lines corresponding to the output signals are sequentially activated.

Referring to FIG. 9, each of the stages of the shift register 641 in FIG. 8 includes a pull up portion 742, a pull down portion 744, a pull up driving portion 746 and a pull down driving portion 748. The pull up portion 742 includes a first N-type metal-oxide semiconductor (NMOS) transistor NT1 having a drain electrode that is electrically connected to the clock signal input terminal CK, a gate electrode that is electrically connected to a third node N3, and a source electrode that is electrically connected to the output terminal OUT. The pull down portion 744 includes a second NMOS transistor NT2 having a drain electrode that is electrically connected to the output terminal OUT, a gate electrode that is electrically connected to a fourth node N4, and a source electrode that is electrically connected to the first source voltage VSS. The pull up driving portion 746 includes a capacitor C, a third NMOS transistor NT3, a fourth NMOS transistor NT4 and a fifth NMOS transistor NT5. The capacitor C has a first terminal electrically connected to the third node N3, and a second terminal electrically connected to the output terminal OUT. For example, a parasitic capacitance may operate as the capacitor C. The third NMOS transistor NT3 includes a drain electrode that is electrically connected to the second source voltage VDD, a gate electrode that is electrically connected to the input terminal IN, and a source electrode that is electrically connected to the third node N3. The fourth NMOS transistor NT4 includes a drain electrode that is electrically connected to the third node N3, a gate electrode that is electrically connected to the control terminal CT, and a source electrode that is electrically connected to the first source voltage VSS. The fifth NMOS transistor NT5 includes a drain electrode that is electrically connected to the third node N3, a gate electrode that is electrically connected to the fourth node N4, and a source electrode that is electrically connected to the first source voltage VSS. For example, a size of the third NMOS transistor NT3 may be two times larger than a size of the fifth NMOS transistor NT5.

The pull down driving portion 748 includes a sixth NMOS transistor NT6 and a seventh NMOS transistor NT7. The sixth NMOS transistor NT6 includes a drain electrode and a gate electrode that are both electrically connected to the second source voltage VDD, and a source electrode that is electrically connected to the fourth node N4. The seventh NMOS transistor NT7 includes a drain electrode that is electrically connected to the fourth node N4, a gate electrode that is electrically connected to the third node N3, and a source electrode that is electrically connected to the first source voltage VSS. For example, a size of the sixth NMOS transistor NT6 may be sixteen times larger than a size of the seventh NMOS transistor NT7.

Referring to FIG. 10, when the first and second clock signals CK1 and CK2, and the scan start signal ST are applied to the shift register 641, the first stage SRC1 delays a high level portion of the first clock signal CK1 by a time Tdr1 to apply a first output signal OUT1 to the output terminal OUT. Similarly, the second stage SRC2 delays a high level portion of the first clock signal CK2 by a time Tdr1 to apply a second output signal OUT2 to the output terminal OUT. A person of skill in the art would recognize the sequential propagation of the delayed scan start signal ST based on the operation of the CK1 and CK2 signals. Further, a person of skill in the art would appreciate that the scan start signal ST would have a setup time of Ts1 prior to the arrival of CK1 and a hold time of Ts2 after the arrival of CK1.

Figure 11:
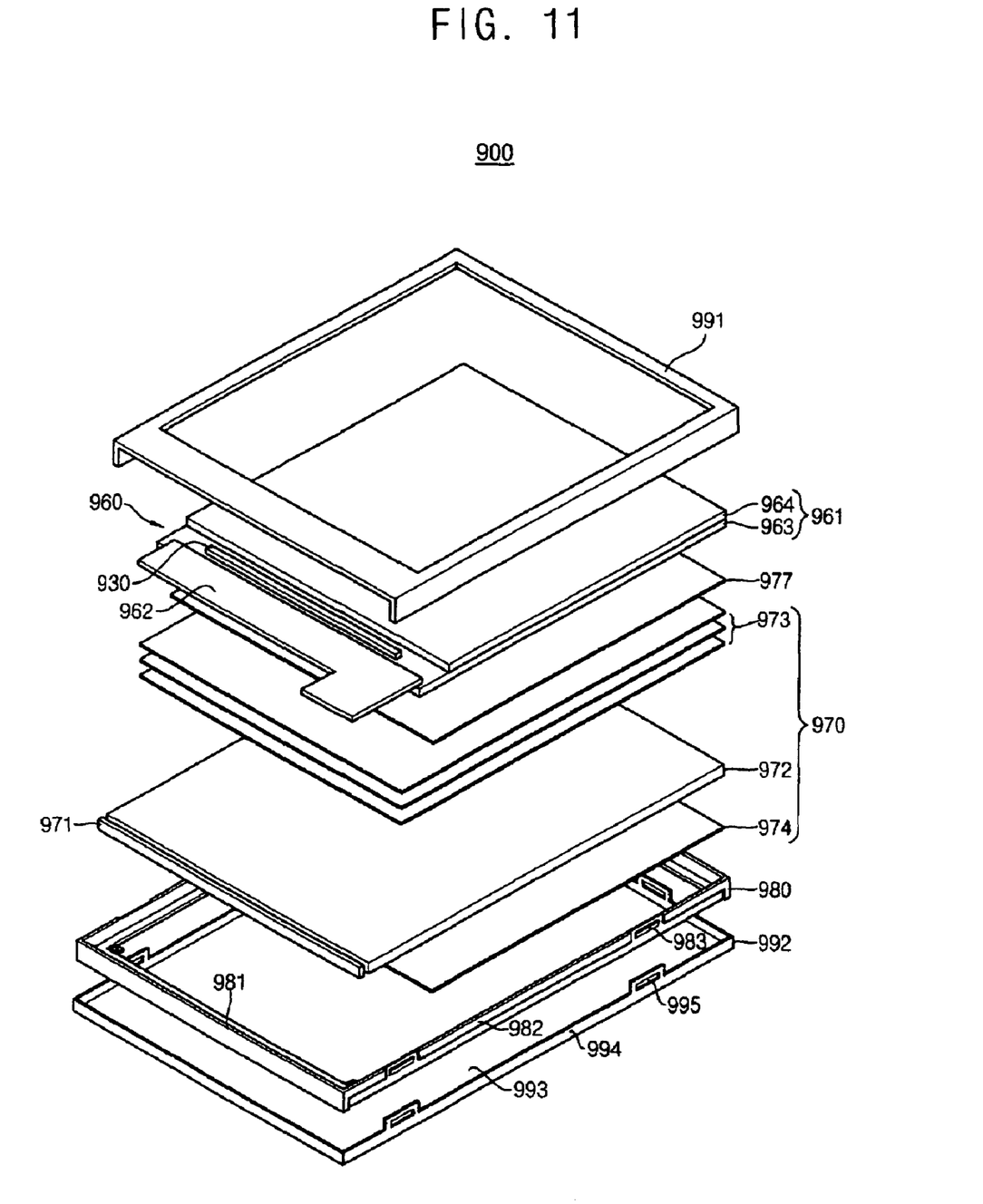
FIG. 11 is an exploded perspective view illustrating a liquid crystal display device according to an exemplary embodiment of the present invention.

FIG. 11 is an exploded perspective view illustrating a liquid crystal display device according to an exemplary embodiment of the present invention. Referring to FIG. 11, a liquid crystal display (LCD) device 900 according to the present embodiment includes an LCD panel assembly 960, a backlight assembly 970, a selectively reflecting film 977, a mold frame 980, an upper chassis 991 and a lower chassis 992. The LCD panel assembly 960 displays an image by using light. The backlight assembly 970 provides the LCD panel assembly 960 with the light. The is selectively reflecting film 977 is disposed between the LCD panel assembly 960 and the backlight assembly 970. The mold frame 980 receives the LCD panel assembly 960, the selectively reflecting film 977 and the backlight assembly 970. The upper and lower chassis 991 and 992 surround the LCD panel assembly 960, while the selectively reflecting film 977 and the backlight assembly 970 to fasten the LCD panel assembly 960, the selectively reflecting film 977 and the backlight assembly 970 to the mold frame 960.

The LCD panel assembly 960 may include an LCD panel 961, a driver chip 930 and a flexible printed circuit 962. The LCD panel 961 includes a TFT array substrate 963, an opposing (or opposite) substrate 964 and a liquid crystal layer (not shown). The TFT array substrate 963 and the opposite substrate 964 face each other. The liquid crystal layer is disposed between the TFT array substrate 963 and the opposite substrate 964. The TFT array substrate 963 includes a plurality of pixels (not shown) arranged in a matrix or array configuration. The pixels are defined by gate lines (not shown) extending along a first direction, and data lines (not shown) extending along a second direction that is substantially perpendicular to the first direction. The gate lines and the data lines are insulated from each other. Each of the pixels includes a pixel electrode (not shown) and a thin-film transistor (not shown) having a gate electrode that is electrically connected to one of the gate lines, a source electrode that is electrically connected to one of the data lines, and a drain electrode that is electrically connected to the pixel electrode. Thin-film transistors of a gate driving circuit section and the thin-film transistors of the pixels of the display section may be simultaneously formed in the same process. The thin-film transistor of the gate driving circuit section and the thin-film transistor of the pixels of the display section may include amorphous silicon. Alternatively, the thin-film transistor of the gate driving circuit section and the thin-film transistor of the pixels of the display section may include poly silicon.

The opposing substrate 964 may include red, green and blue color filters (not shown). The red, green and blue color filters may be formed through a thin-film process. The opposing substrate 964 may further include a common electrode facing the pixel electrodes of the TFT array substrate 963. When a data voltage is applied to the pixel electrode of the TFT array substrate 963, an electric field is generated between the common electrode of the opposing (or opposite) substrate 964 and the pixel electrode of the TFT array substrate 964. As a result, an arrangement of liquid crystal molecules of the liquid crystal layer disposed between the common electrode and the pixel electrode is changed to adjust optical transmissivity.

The driver chip 930 that applies signals to the data lines and the gate lines is mounted at a first end portion of the TFT array substrate. A data driver chip (not shown) and a gate driver chip (not shown) may be integrated to form the driver chip 930 as shown in FIG. 11. Alternatively, the data driver chip and the gate driver chip may be separately formed from each other. Additionally, the driving circuit section that provides at least one of the main and sub display sections with gate signals may be integrated to the driver chip 960. The driver chip 960 may be mounted on the TFT array substrate, for example, through a chip-on-glass (COG) method.

The flexible printed circuit 962 is combined with the first end portion of the TFT array substrate 963. The flexible printed circuit 962 conducts or transfers control signals for controlling the driver chip 930. The flexible printed circuit 962 may include a timing controller configured to determine the driver signal timing, and a memory configured to store data signals, formed thereon. The flexible printed circuit may be electrically connected to the wiring of the TFT array substrate 963 through an anisotropic conductive film (ACF).

The backlight assembly 970 is disposed under the LCD panel assembly 960. The backlight assembly 970 provides the LCD panel assembly 960 with uniform light. The backlight assembly 970 may include a light source 971, a light-guide plate 972, optical sheets 973 and a light reflecting plate 974. The light source 971 generates light, the light-guide plate 972 guides the light generated by the light source 971 to the LCD panel assembly 960, the optical sheets 973 enhance optical characteristics of light guided by the light-guide plate 972, and the light reflecting plate 974 reflects light that may leak from the light-guide plate 972 toward the light-guide plate 972.

The light source 971 is disposed adjacent to a side of the light-guide plate 972 to provide the light-guide plate 972 with light. In one embodiment, a cold cathode fluorescent lamp (CCFL) or an external electrode fluorescent lamp (EEFL) may be employed as the light source 971. Alternatively, a light-emitting diode (LED) having relatively smaller power consumption may be employed as the light source 971. A flexible printed circuit (not shown) for controlling the light source 971 may be attached to the light source 971. In the present embodiment, the light source 971 is disposed adjacent to a side of the light-guide plate 972. Alternatively, more than one light sources 971 may be disposed at sides of the light-guide plate 972, respectively. Alternatively, a plurality of light sources 971 may be disposed under the LCD panel assembly 960 in parallel. When the light sources 971 are disposed under the LCD panel assembly 960, the light-guide plate 972 is optional. The light-guide plate 972 may include a light-guide pattern (not shown) guiding light toward the LCD panel 961 displaying an image.

The optical sheets 973 are disposed between the light-guide plate 972 and the LCD panel 961. The optical sheets 973 enhance optical characteristics such as luminance uniformity. Light that exits from the optical sheets 973 is applied to the LCD panel 961. The selectively reflecting film 977 may be disposed between the LCD panel assembly 960 and the backlight assembly 970. The selectively reflecting film 977 may reflect at least a portion of the incident light from a light beam and transmit a remaining portion of the incident light. Therefore, the LCD panel may display an image even when the light source 971 of the backlight assembly 970 is turned off. The selectively reflecting film 977 reflects a portion of light, and transmits a remaining portion of the light. Therefore, when the light source 971 of the backlight assembly 970 is turned on, light generated by the backlight assembly 970 passes through the selectively reflecting film 977 to enter the LCD panel 961, so that an image is displayed. When the light source 971 of the backlight assembly 970 is turned off, ambient light that enters the LCD panel 961 is reflected by the selectively reflecting film 977 to enter the LCD panel 961, so that an image is displayed. As a result, when the LCD panel 961 is driven in the standby mode and the light source 971 of the backlight assembly 970 may be turned off, the LCD panel 961 may display an image by ambient light. In this manner, power consumption may be reduced.

The mold frame 980 sequentially receives the light reflecting plate 974, the light-guide plate 972, the optical sheets 973 and the LCD panel 961. The mold frame 980 includes a bottom face 981 having an opening portion, and side faces 982 extending from edge portion of the bottom face 981. In one exemplary embodiment, the mold frame 980 may be constructed from plastic. The flexible printed circuit 962 is bent along side faces 982 of the mold frame 980. A plurality of combination protrusions 983 to combine the mold frame 980 to the lower chassis 992 may be formed at the side faces 982 of the mold frame 980.

In one exemplary embodiment, the lower chassis 992 may be constructed from metal. The lower chassis 992 receives the mold frame 980. The lower chassis 992 includes a bottom plate 993 and side plates 994 extended from edge portions of the bottom plate 993 to define a receiving space. The side plate 994 may include a plurality of combination holes 995 corresponding to the combination protrusions 983 of the mold frame 980. When the mold frame 980 is combined with the lower chassis 992, the side plate 994 of the lower chassis 992 is disposed outside of the side faces 982 of the mold frame 980. The combination protrusions 983 are inserted into the combination holes 995 to combine the mold frame 980 and the lower chassis 992. In order to reduce a size of the LCD device, one of an inner side of the side plate 994 of the lower chassis 992 and an outer side of the side faces 982, which are overlapping with each other, may be recessed. The upper chassis 991 is disposed over the LCD panel 961. The upper chassis 991 covers side portions of the LCD panel 961 such that a display section is disclosed, and is combined with the lower chassis 992. Therefore, the upper chassis 991 fastens the LCD panel 961 to the lower chassis 992.

According to the TFT array substrate and the LCD device described above, even when the display device does not display the main image, the display device displays the standby image that may be helpful to a user through a portion of the display section. Therefore, power consumption may be reduced in comparison with a case that an entire portion of the display section is operated. Additionally, the sub display section that displays the standby image is driven through the driver chip that is mounted on the TFT array substrate and has low power consumption, and the main display section that is occasionally turned on is driven by TFTs directly formed on the TFT array substrate. As a result, a size of the driver chip is reduced while reducing power consumption.

Having described the example embodiments of the present invention and their advantages, it is noted that various changes, substitutions and alterations can be made herein without departing from the spirit and scope of the invention as defined by appended claims.

What is claimed is:

1. A thin-film transistor (TFT) array substrate, comprising:
    a display section including a high definition section and a low definition section;
    a peripheral section surrounding the display section;
    a driving circuit section formed on the peripheral section configured to provide the high definition section with a plurality of first gate signals; and
    a driver chip mounted on the peripheral section configured to provide the low definition section with a plurality of second gate signals.

2. The TFT array substrate of claim 1, wherein the driving circuit section comprises an amorphous silicon thin-film transistor.

3. The TFT array substrate of claim 1, further comprising a signal wiring formed along a first side of the display section to conduct a gate driving signal from the driver chip to the low definition section, the driving circuit section being formed along at least a second side of the display section.

4. The TFT array substrate of claim 1, wherein the low definition section has a first aperture ratio and the high definition section has a second aperture ratio, the first aperture ratio being higher than the second aperture ratio.

5. The TFT array substrate of claim 1, wherein the low definition section includes a low definition pixel that has a first area and the high definition section includes a high definition pixel that has a second area, the first area being larger than the second area.

6. A thin-film transistor (TFT) array substrate that operates in a full operation mode or in a standby mode, the thin-film transistor (TFT) array substrate comprising:
    a base substrate;
    a main display section formed on the base substrate, the main display section being configured to operate in the full operation mode;
    a sub display section formed on the base substrate, the sub display section being configured to operate in the standby mode;
    a driving circuit section directly formed on the base substrate, the driving circuit section being configured to provide the main display section with a plurality of first gate signals; and
    a driver chip mounted on the base substrate, the driver chip being configured to provide the sub display section with a plurality of second gate signals.

7. The TFT array substrate of claim 6, wherein the main display section has a main display resolution and the sub display section has a sub display resolution, the main display section resolution being higher than the sub display resolution.

8. The TFT array substrate of claim 6, wherein the driving circuit section comprises an amorphous silicon thin-film transistor.

9. The TFT array substrate of claim 6, further comprising a signal wiring formed along a first side of the display section to conduct a gate driving signal from the driver chip to the sub display section, the driving circuit section being formed along at least a second side of the display section.

10. The TFT array substrate of claim 6, wherein the sub display section has a first aperture ratio and the main display section has a second aperture ratio, the first aperture ratio being higher than the second aperture ratio.

11. The TFT array substrate of claim 6, wherein the sub display section includes a low definition pixel that has a first area and the main display section includes a high definition pixel that has a second area, the first area being larger than the second area.

12. A thin-film transistor (TFT) array substrate comprising:
    a display section having a plurality of regions;
    a peripheral section surrounding the display section; and
    a driving circuit section formed on the peripheral section, the driving circuit section including an amorphous silicon thin-film transistor and providing at least one of the regions of the display section with a plurality of gate signals.

13. The TFT array substrate of claim 12, wherein the display section comprises a high definition section and a low definition section, the driving circuit section providing the high definition section with a first gate signal.

14. The TFT array substrate of claim 13, further comprising:
    a driver chip mounted on the peripheral section, the driver chip providing the low definition section with a second gate signal; and
    a signal wiring formed along a first side of the display section to conduct a gate driving signal from the driver chip to the low definition section, the driving circuit section being formed along at least a second side of the display section.

15. The TFT array substrate of claim 12, wherein the display section comprises a main display section displaying a main image in a full driving mode, and a sub display section displaying a sub image in a standby mode, the driving circuit section providing the main display section with a first gate signal.

16. The TFT array substrate of claim 15, further comprising:
    a driver chip mounted on the peripheral section, the driver chip providing the sub display section with a second gate signal; and
    a signal wiring formed along at least a first side of the display section to conduct a gate driving signal from the driver chip to the sub display section, the driving circuit section being formed along at least a second side of the display section.

17. A thin-film transistor (TFT) array substrate comprising:
    a display section having a plurality of regions;
    a peripheral section surrounding the display section; and
    a driving circuit section integrally formed with the TFT substrate, the driving circuit section providing one of the regions of the display section with a first gate signal.

18. The TFT array substrate of claim 17, wherein the display section comprises a high definition region and a low definition region, the driving circuit section providing the high definition region with the first gate signal.

19. The TFT array substrate of claim 18, further comprising:
    a driver chip mounted on the peripheral section, the driver chip providing the low definition region with a second gate signal; and
    a signal wiring formed along at least a first side of the display section to conduct a gate driving signal from the driver chip to the sub display section, the driving circuit section being formed along at least a second side of the display section.

20. The TFT array substrate of claim 17, wherein the display section comprises:

a main display section operating in a full operation mode; and a sub display section operating in a standby mode, the driving circuit section providing the main display section with the first gate signal.

21. The TFT array substrate of claim 20, further comprising:

a driver chip mounted on the peripheral section, the driver chip providing the sub display section with a second gate signal; and a signal wiring formed along at least a first side of the display section, the signal wiring conducting a gate driving signal from the driver chip to the sub display section, the driving circuit section being formed along at least a second side of the display section.

22. The TFT array substrate of claim 17, wherein the driving circuit section comprises an amorphous silicon thin-film transistor.

23. A thin-film transistor (TFT) array substrate comprising:

a substrate including a display section having a first display section displaying a first image, and a second display section displaying a second image;

a driver chip providing the first display section with a first gate signal;

a signal wiring formed along at least a first side of the first and second display sections, the signal wiring conducting the first gate signal from the driver chip to the first display section; and a driving circuit section formed along at least a second side of the display section, the driving circuit section providing the second display section with a second gate signal.

24. The TFT array substrate of claim 23, wherein the driving circuit section comprises an amorphous silicon thin-film transistor.

25. The TFT array substrate of claim 23, wherein the first display section has a first resolution and the second display section has a second resolution, the first resolution being lower than the second resolution.

26. The TFT array substrate of claim 23, wherein the first display section has a first aperture ratio and the second display section has a second aperture ratio, the first aperture ratio being higher than the second aperture ratio.

27. A thin-film transistor (TFT) array substrate comprising:

a display section including a first display section and a second display section;

a peripheral section surrounding the display section;

a first driving circuit section formed on a portion of the peripheral section adjacent to the first display section, the first driving circuit section providing a first gate signal to the first display section; and a second driving circuit section formed on a portion of the peripheral section adjacent to the second display section, the second driving section providing a second gate signal to the second display section.

28. The TFT array substrate of claim 27, wherein the first and second driving circuit sections comprise an amorphous silicon thin-film transistor.

29. The TFT array substrate of claim 27, wherein the first display section has a first resolution and the second display section has a second resolution, the first resolution being higher than the second resolution.

30. The TFT array substrate of claim 27, wherein the first display section comprises a plurality of gate lines formed thereon, and the first driving circuit section comprises:

a first gate driving section providing odd-numbered gate lines of the plurality of gate lines with the first gate signal; and a second gate driving section providing even-numbered gate lines of the plurality of gate lines with the first gate signal.

31. The TFT array substrate of claim 30, wherein the first gate driving section is formed at a first peripheral region of the peripheral section, and the second gate driving section is formed at a second peripheral region disposed oppositely from the first peripheral region with respect to the display section.

32. The TFT array substrate of claim 27, wherein the second display section comprises a plurality of gate lines formed thereon, and the second driving section comprises:

a third gate driving section providing odd-numbered gate lines of the plurality of gate lines with the second gate signal; and a fourth gate driving section providing even-numbered gate lines of the plurality of gate lines with the second gate signal.

33. The TFT array substrate of claim 32, wherein the third gate driving section is formed at a first peripheral region of the peripheral section, and the fourth gate driving section is formed at a second peripheral region disposed oppositely from the first peripheral region with respect to the display section.

34. A liquid crystal display (LCD) device comprising:

a TFT array substrate comprising a plurality pixels that are arranged in a matrix configuration and defined by a plurality of gate lines and a plurality of data lines, each of the pixels comprising a thin-film transistor that is electrically connected to one of the plurality of gate lines and one of the plurality of data lines;

an opposing substrate that is combined with the TFT substrate such that the opposing substrate faces the TFT array substrate; and a liquid crystal layer disposed between the TFT array substrate and the opposing substrate, wherein the TFT array substrate further comprises:

a display section including a plurality of regions;

a peripheral section surrounding the display section; and a driving circuit section integrally formed with the TFT array substrate, the driving circuit section providing at least one of the regions of the display section with a first gate signal.

35. The LCD device of claim 34, further comprising:

a selectively reflecting film configured to reflect at least a portion of light from an incident light beam, and transmit a remaining portion of the light.

36. The LCD device of claim 34, wherein the driving circuit section comprises an amorphous silicon thin-film transistor.

37. The LCD device of claim 34, wherein the display section comprises a high definition region and a low definition region, the driving circuit section providing the high definition region with the first gate signal.

38. The LCD device of claim 37, wherein the low definition region has a first aperture ratio and the high definition region has a second aperture ratio, the first aperture ratio being higher than the second aperture ratio.

39. The LCD device of claim 37, wherein the TFT array substrate further comprises:

a driver chip mounted on the peripheral section, the driver chip providing the low definition region with a second gate signal; and a signal wiring formed along at least a first side of the display section, the signal wiring conducting a gate driving signal from the driver chip to the low definition region, the driving circuit section being formed along at least a second side of the display section.

40. The LCD device of claim 34, wherein the display section comprises:

a main display section displaying a main image in a full operation mode; and a sub display section displaying a sub image in a standby mode, the driving circuit section providing the main display section with the first gate signal.

41. The LCD device of claim 40, wherein the TFT array substrate further comprises:

a driver chip mounted on the peripheral section, the driver chip providing the sub display section with a second gate signal; and a signal wiring formed along at least a first side of the display section, the signal wiring conducting a gate driving signal from the driver chip to the sub display section, the driving circuit section being formed along at least a second side of the display section.

42. A liquid crystal display (LCD) device, comprising:

an LCD panel comprising:

a TFT array substrate comprising a display section and a peripheral section surrounding the display section, the peripheral section including a plurality of driving circuit sections formed thereon, the driving circuit sections providing the display section with a gate signal;

an opposing substrate combined with the TFT array substrate such that the opposing substrate faces the TFT array substrate; and a liquid crystal layer disposed between the TFT array substrate and the opposing substrate; and a driver chip providing the driving circuit sections with a gate driving signal.

43. The LCD device of claim 42, wherein the driving circuit sections comprise an amorphous silicon thin-film transistor.

44. The LCD device of claim 42, wherein the display section comprises:

a first display section having a high resolution; and a second display section having a low resolution.

45. The LCD device of claim 44, wherein the driver chip drives the first display section and the second display section in a full operation mode, the driver chip driving only the second display section in a standby mode.

46. The LCD device of claim 45, wherein the first display section displays a main image, the second display section displaying a sub image in the full operation mode.

47. The LCD device of claim 45, wherein both of the first and second display section display a main image.

48. The LCD device of claim 45, wherein the second display section displays a sub image in the standby mode.

49. The LCD device of claim 42, wherein the driving circuit sections comprise:

a first driving section formed on a portion of the peripheral section adjacent to the first display section, the first driving section providing a plurality of gate lines formed in the first display section with a first gate signal; and a second driving section formed on a portion of the peripheral section adjacent to the second display section, the second driving section providing a plurality of gate lines formed in the second display section with a second gate signal.

50. The LCD device of claim 49, wherein the first driving section comprises:

a first gate driving section providing odd-numbered gate lines with the first gate signal; and a second gate driving section providing even-numbered gate lines with the first gate signal.

51. The LCD device of claim 49, wherein the second driving section comprises:

a third gate driving section providing odd-numbered gate lines with the second gate signal; and a fourth gate driving section providing even-numbered gate lines with the second gate signal.

* * * * *